May 8, 1956     R. M. DANIELS ET AL     2,744,840
SUGAR PURIFICATION ION EXCHANGE METHOD AND APPARATUS
Filed June 16, 1950
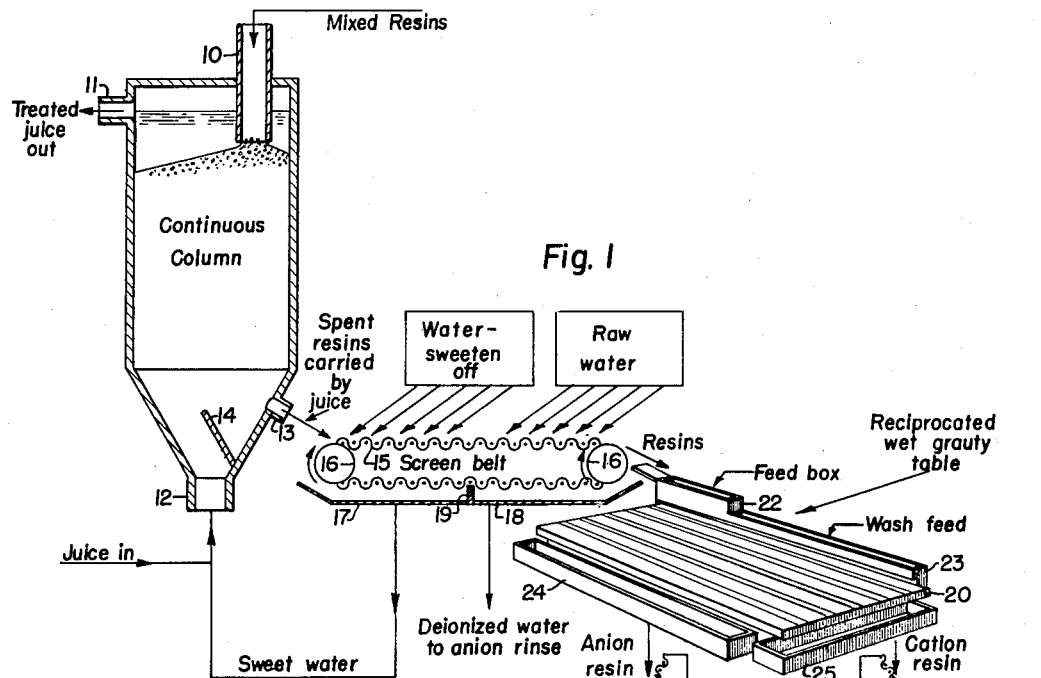
Fig. 1
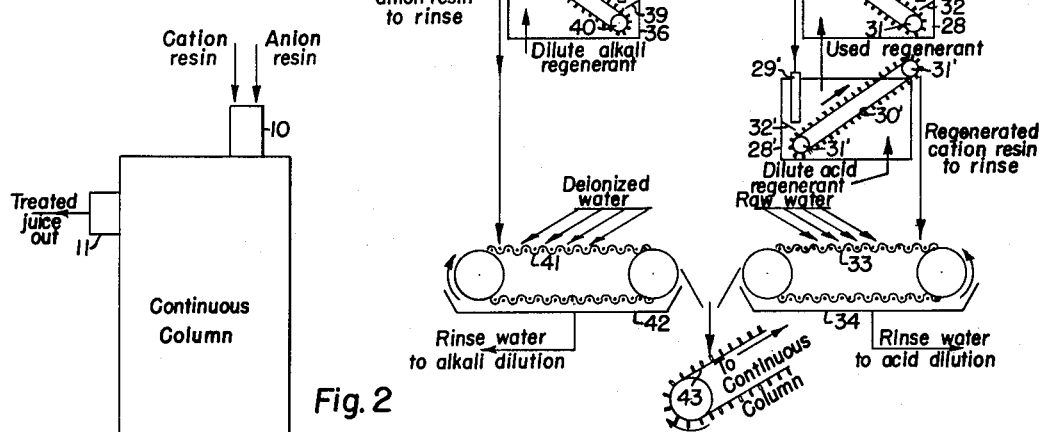
Fig. 2
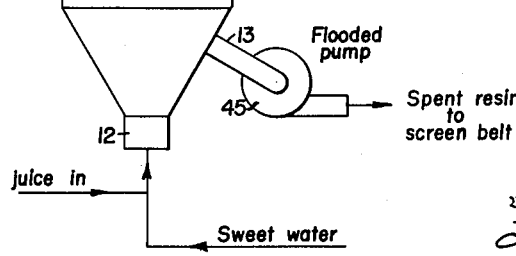
Inventors
ROBERT M. DANIELS
JOSEPH E. MAUDRU
GUY O. RORABAUGH
By Lamphere & Van Valkenburgh
Attorneys

United States Patent Office 2,744,840
Patented May 8, 1956

2,744,840

SUGAR PURIFICATION ION EXCHANGE METHOD AND APPARATUS

Robert Martin Daniels, Joseph E. Maudru, and Guy O. Rorabaugh, Colorado Springs, Colo., assignors to Holly Sugar Corporation, Colorado Springs, Colo., a corporation of New York Application June 16, 1950, Serial No. 168,584

5 Claims. (Cl. 127—46)

This invention relates to ion exchange, and more particularly to an ion exchange method and apparatus for the purification of sugar juices.

In the conventional beet sugar factory, in accordance with methods in use for a number of years, the beets are cleaned, as by washing and trash separation, then cut into relatively long, thin slices, as by sets of rotating knives. These slices are commonly known as "cossettes" and the present preferred cross section is square or a modified or broad V. The cossettes may be placed in cells in a diffusion battery, which also may be continuous, and heated water passed through the same to dissolve out the sugar. Of course, the heated water also tends to dissolve or carry out other compounds or constituents contained in the beets, which appear in the beet juice as impurities, and which not only may produce an undesirable color or taste of the sugar, but also may interfere with subsequent boiling and crystallization operations. To remove as much of these impurities as possible, it has been customary to treat the raw juice by defecation, i. e. with lime and then with carbon dioxide, followed by filtration, and also further to treat by sulphur dioxide, filtration, and passage through bone-char, kieselguhr, or the like.

Recently, there has been considerable interest in a different type of purification, involving ion exchange. Thus, a cation exchanger may be utilized to convert sodium, potassium, calcium, or magnesium salts, certain organic compounds, and the like, into a corresponding acid. In other words, the cation exchange material exchanges $H^+$ for $Na^+$, $K^+$, $Ca^{++}$, $Mg^{++}$, and the like, the acid thus formed being retained in the juice, and the exchanged ion remaining with the cation exchange material. The anion exchange material has an opposite chemical property, i. e. it will tend to take up or absorb the acid, exchanging an $OH^-$ ion therefor. When the anion exchange material exchanges $OH^-$ for the acid radical, such as $Cl^-$, $SO_4^=$, and various organic radicals, such impurity will have been removed from the juice, since the $H^+$ of the acid combines with the $OH^-$ from the anion exchange material to form $H_2O$, and the acid radical remains with the anion exchange material.

In the application of the ion exchange process to sugar factories or mills, particularly beet sugar factories, it has been customary to use several series of ion exchangers, each series including a cation exchange bed and an anion exchange bed. It has been believed necessary to provide at least four sets of beds, so that one set can be utilized for ion exchange while the other three sets are regenerated. The ion exchange material, of course, eventually becomes exhausted, and must be regenerated, as by passing sulphuric acid, or other strong mineral acid through the cation exchange material, and a base such as ammonium hydroxide, sodium carbonate or sodium hydroxide through the anion exchange material. The necessity for using at least four sets of beds increases the installation and operating costs, since the various parts of the original equipment are relatively numerous and a fairly complicated system of piping, supply tanks and the like are required for regeneration of the various beds in sequence. Particularly in sugar beet districts, where the factories may operate for from two to four months out of the year only, with the equipment lying idle the remainder of the year, any reduction in initial plant investment is highly important. Also, the ion exchange material or resins themselves are quite costly.

Ion exchange may be carried out in conjunction with defecation by lime, or in lieu thereof, and either before or after defecation, although a portion of the impurities can be removed more cheaply by defecation, so that it is generally preferred to remove as many impurities as possible by defecation, then remove the remainder by ion exchange. However, due to the relatively low temperature at which ion exchange through series beds must take place, it is generally necessary to cool the juice, after extraction of the sugar from beets or cane, either with or without defecation, and this usually comprises a direct operating loss, since after ion exchange, the juice must again be heated for evaporation and crystallization.

Among the objects of this invention are to provide a novel ion exchange method; to provide such a method which is particularly adapted for the treatment of sugar solutions; to provide such a method which may be utilized in the treatment of sugar solutions obtained by the extraction of sugar by means of water from sugar beets; to provide such a method which is also useful in the treatment of solutions or juices extracted from sugar cane; to provide such a method which permits ion exchange to be carried out at a more nearly neutral pH, and thus reduce inversion losses; to provide such a method which requires a smaller amount of resins or ion exchange material than series beds; to provide such a method by which a higher purity of juice or solution can be obtained, thus reducing evaporation and crystallization costs; to provide such a method which permits the juice to be subjected to an ion exchange treatment at relatively high temperatures, compared with those necessary to prevent undue inversion losses in the use of series exchange beds; to provide such a method which can be carried out with optimum efficiency; to provide apparatus particularly adapted to carry out the above method; to provide such apparatus which involves fewer parts and less initial plant investment than series bed ion exchange apparatus; to provide such apparatus which eliminates the piping and other apparatus necessary for changeover of series beds from ion exchange to regeneration; and to provide such apparatus which is highly effective in operation.

Additional objects and the novel features of this invention will become apparent from the description which follows.

In the method of this invention, the sugar juice or solution is passed through a bed of ion exchange material which comprises a mixture of anion and cation resins or material, rather than first through a cation exchange bed and then through an anion exchange bed, fresh cation and anion exchange material being substantially continuously supplied to the bed at one point and exhausted cation and anion exchange material being substantially continuously removed from the bed at another point. Preferably, the sugar juice or solution is passed through the bed countercurrent to the movement of ion exchange material through the bed, and a portion of the incoming sugar juice or solution is utilized as a carrier to remove exhausted ion exchange material. The exhausted ion exchange material is separated from the carrier sugar juice or solution, preferably a portion of the juice entering the bed, and the carrier solution is continuously recycled back to the bed. The exhausted ion exchange material, which has been removed, is then washed, and the anion and cation exchange material are separated hydraulically, the separate materials regenerated, and then recycled to the bed. The regeneration of the separated resins may be accomplished by any suitable reagent, such as sulphuric acid or the like for the cation resin and sodium or ammonium hydroxide or the like for the anion resin.

It is to be noted that, in accordance with this invention, both the removal of the exhausted resins from the bed and the separation into anion and cation components is preferably accomplished hydraulically, thus avoiding the attrition and grinding effect of mechanical handling which tends to produce a considerable amount of fines, the latter tending to become more difficult to separate and to become lost by being carried away with regeneration or wash liquid.

In a mixed ion exchange bed, the pH may be maintained more nearly neutral, since the acid formed by the cation exchange material may immediately contact anion exchange material, so that the time period during which the juice or any portion thereof has a low pH is reduced to a minimum. It will also be noted that since the pH is maintained more nearly neutral, the juice may be passed through the bed at substantially as high a temperature as permitted by the anion resin, without undue inversion loss. Thus, there is less necessity for cooling after sugar extraction or after defecation, and therefore less necessity for reheating for subsequent evaporation and crystallization. There may, of course, be a limitation upon the temperature of the juice due to a tendency for the anion exchange material to degrade and lose a portion of its capacity at higher temperatures. Thus, the anion exchange may produce an upper limit of temperature, rather than inversion loss. Nevertheless, the present invention permits advantage to be taken of future improvements in anion exchange material, permitting higher temperatures of operation, which improved anion exchange material would have no particular advantage, with respect to temperature of operation, in use in series beds.

The effluent juice, passing from the bed, also may be maintained at a high degree of purity, since the effluent juice is always contacting fresh resins, whereas in the operation of series beds, even though a bed is only partially exhausted, the effectiveness of ion exchange has been reduced somewhat, so that the purity will tend to vary from the maximum produced by a completely fresh bed to a lower percentage, produced by a partially exhausted bed.

As will also be evident, the use of a mixed bed, to which fresh resin is continuously being supplied and from which exhausted resins are continuously removed, increases the capacity of a bed of a specific size, or stated in other words, reduce the amount of resins required to treat a specific volume and flow of juice. Thus, the original investment in resins is considerably lower than for series beds. There must, of course, be a certain amount of resins being separated and regenerated, but the additional amount of resins required is far less than would be required to form the additional series beds necessary for operation with the previous stationary bed process.

The foregoing method may be carried out by apparatus illustrated in the accompanying drawing, in which:

Fig. 1 is a partly diagrammatic representation of apparatus constructed in accordance with this invention, which also serves as a flow sheet of the method of this invention; and Fig. 2 is a partly diagrammatic representation of a portion of the apparatus, comprising a continuous bed column, as used in an alternative arrangement.

As illustrated in the drawing, fresh mixed resins, or a mixture or mass of anion exchange material and cation exchange material, and preferably in equal amounts of each, are substantially continuously introduced into the top of a suitable column or vessel, as through a pipe or tube 10, and the treated sugar juice or solution is continuously removed from the upper end of the column, as through an outlet 11. Tube 10 preferably extends to a point below the level of juice outlet 11, to avoid possible loss of resin, while the incoming resins may be mixed or merely introduced in substantially equal proportions, since resins dumped below the surface of the juice will tend to mix, due to a relatively small angle of repose and a specific gravity similar to that of the juice. In any event, striation in the resin bed should not materially affect the ion exchange operation. The untreated sugar juice or solution is introduced at the lower end of the column, as at an inlet 12, and at a point slightly above the lower end, the spent resins are removed by a portion of the incoming juice, as at a resin outlet 13. Stated in another way, the spent resins are removed hydraulically, while a portion of the incoming juice flows out with the spent resins. The juice inlet 12 and resin outlet 13 may be separated by a baffle 14, to prevent direct flow of incoming juice to the resin outlet and to force juice passing through the resin outlet to carry exhausted resins with it. The amount of juice necessary to carry away exhausted resins need not be relatively large, but only sufficient to form a slurry consisting, for example, of 1½ parts of juice to 1 part of drained resins, although the amount of juice which is recirculated or recycled from the bottom of the column may, of course, be as large as desired, in order to carry off the spent resins effectively, and to minimize the attrition or grinding effect on the resins caused by movement thereof.

The juice carrying the spent resins flows onto a continuously moving mesh belt or screen 15, such as a woven wire mesh driven by rolls 16, so that the juice may drain from the resins, through the lower pass of the screen and into a juice section 17 of a collecting tank or tray. The resins may also be washed or "sweetened off" by raw water sprayed thereon above section 17, the amount of water being sufficient to displace the remaining juice, such as equal to the "void volume" of the resins, which in previous operations have been about 60% of the total volume of the resins, or about 67.5 gals. per min. for 10 cu. ft. per min. of each resin. The drained juice and water are returned as "sweet water" to inlet 12 at the lower end of the column, and on screen 15, the resins are further washed by raw water discharged thereon by suitable sprays or the like, above a deionized water collecting section 18, to provide deionized water for rinsing regenerated anion exchange material, as described later. The amount of deionized water may be on the order of 150 gal. per min. for rinsing 10 cu. ft. per min. of anion exchange material, plus 72 gal. per min., or any other desired amount, for ammonia dilution, the dilute ammonia solution being utilized for regeneration of the anion exchange material. The belt or screen 15 may be driven at a relatively slow speed by rolls 16, and the tank sections 17 and 18 may be separated by an adjustable partition or baffle 19, while the deionized water may be passed from tank section 18 through suitable piping to an anion rinse tank, as hereinafter described, and also to an ammonia dilution tank (not shown).

In the continuous column, the incoming juice moves upwardly, and the resins move downwardly, by gravity, the movement of the resins being sufficiently slow so that adequate contact of the juice with each portion of the resin bed is insured, and so that the resins wil be sufficiently close together that the interval between contact of a specific portion of the juice with a cation resin particle and a subsequent anion resin particle will be reduced to a minimum.

The purity of the juice discharged from the column may be maintained at or above 99%, since all of the juice, before it leaves the column, passes through fresh regenerated resins. This purity will, in general, exceed that which could be obtained from passing the syrup through beds of cation and anion resins, in series. The following table shows the results of passing identical portions of syrup through a bed consisting of a mixture of anion and cation resins, and the same amount of resins placed in separate beds, it being understood that the mixed bed was not continuously replaced, as in the present invention.

| Amount of Juice Through Beds | Purity of Effluent Juice | |
|---|---|---|
| | Separate Beds | Mixed Bed |
| | Percent | Percent |
| 4 Liters | 96.9 | 99.8 |
| 6 Liters | 96.9 | 98.0 |
| 7.2 Liters | 93.8 | 94.4 |
| 7.8 Liters | | 90.7 |
| 8.8 Liters | 89.2 | |
| 9.4 Liters | [1] 88.2 | 86.1 |

[1] By extrapolation.

As will be evident from the above, the maximum purity obtained through passage of the syrup through separate beds was 96.9%, and the purity dropped to 88.2% before the bed was exhausted, whereas the maximum purity for the mixed bed was 99.8%, and the purity dropped to 86.1% before exhaustion. Thus, although the purity of the syrup through a stationary mixed bed dropped more rapidly than that through the separate bed, after the point of break-through was reached, the higher purity in the initial stages can be maintained with a continuously regenerated mixed bed.

As will be evident, a continuously regenerated mixed bed produces superior results, both with respect to a stationary mixed bed which is utilized to exhaustion, or separate beds which are utilized to exhaustion. It will be understood, of course, that in the case of separate beds, the bed in use can only produce juice having a purity on the order of the maximum purity obtainable from a series bed, i. e. such as 96.9% in the above instance. It is to be noted that the exhaustion of either a mixed bed or separate beds of ion exchange materials does not come about all at once. There are certain ions which appear to be selectively reacted or absorbed, by the cation exchange material, the greatest affinity being for potassium compounds. Thus, until the cation bed is completely exhausted, it will still react with potassium compounds. Next in the order of selection appear to be sodium compounds, then calcium compounds, then magnesium compounds, and finally nitrogen or nitrogenous compounds, particularly amino acids, and other organic compounds containing nitrogen. Other compounds may, of course, react less readily than potassium compounds or more readily than nitrogen or nitrogenous compounds, since calcium and magnesium compounds are not intended to be a complete list of those intermediate in selectivity, but merely representative. In other words, the nitrogen or nitrogenous compounds appear to 'leak" first—that is, when the bed becomes partially exhausted, the nitrogen or nitrogenous compounds will pass through the bed without the ion being absorbed or exchanged, and appear as an impurity or "leak" in the effluent juice. As will be evident, unless the cation exchange material converts a salt or similar inorganic or organic compound into an acid or the like, the anion exchange material will have no opportunity to react with the same. Thus, as soon as nitrogenous compounds begin to leak through and appear in the effluent juice, the bed is no longer usable, and in the operation of a series bed, when this point is reached, the pair of beds is "sweetened off," and the juice flow transferred to another set or pair of beds. While there are different theories to explain such leakage, one being that as long as there are H+ ions in the cation bed there will be no leakage, another is that nitrogen compounds, for instance, may be displaced by potassium compounds or compounds for which the bed has a greater affinity. On the basis of either theory, there may, of course, be considerable capacity remaining in the bed, particularly for reaction or exchange with magnesium, calcium, sodium or potassium compounds. In a stationary bed, the "leak" progresses, much in the manner of the advancing wave front, from the entrance point of the juice to the bed, to the exit point thereof. Thus, as successive portions of the juice pass through the bed, the cation exchange material at the entrance may soon begin to leak nitrogen or nitrogenous compounds, and this point of leak passes on through the bed. Progressively thereafter, successive portions of the bed will begin to leak magnesium, then calcium, then sodium and finally potassium compounds. However, in a stationary bed, when the nitrogen or nitrogenous compounds begin to leak at the exit, the ion exchange material at the entrance may still have a relatively tremendous capacity for absorbing or reacting with other compounds, and may not have even approached the saturation point for any compounds except the nitrogenous compounds, for instance, which it may leak. Nevertheless, because the bed is leaking nitrogenous compounds, it is no longer usable. Moreover, in stationary series beds, the pH is relatively low because of the acid constituents produced in the cation bed, and because of equilibrium constants, the activity of the resin is reduced, which consequently reduces the amount of impurities removed from the juice.

In the case of a continuously replenished mixed bed, not only is the maximum impurity removal obtainable by a stationary mixed bed obtained, but is obtained continuously. There is also less possibility of accidental leakage of nitrogenous compounds or the like, as an impurity in the effluent juice, since the incoming fresh resins will be contacting juice from which probably all impurities except nitrogenous compounds or those last to be removed, have already been removed prior to reaching the incoming fresh resins. Thus, the resins contacted by the juice just prior to discharge of the resins will probably be primarily removing potassium compounds and the like, i. e. those which "leak" last, since they are probably already saturated with the other compounds. The next previous resins will probably be removing some potassium compounds, and also sodium and perhaps calcium compounds. Similarly, resins higher in the bed will be removing probably primarily calcium and magnesium compounds. Thus, as the resins pass downwardly through the bed, they are first contacted with juice from which all the more readily removable compounds have been eliminated, so that the full power of the fresh resins, as it were, may be exerted upon the compounds most difficult to remove, without interference due to selective reaction or absorption, by impurities more readily removed. While an approach to a similar condition is attempted in a series of stationary beds, at the same time, the beds must be run as long as possible, before regeneration, to reduce the cost of treatment to a minimum, and completely fresh beds of resins can be operated only until a fraction of their ultimate capacity has been utilized, before the amount of impurities removed begins to drop.

In a mixed bed, the pH or acidity of the juice will be maintained higher than in a cation exchange bed, so that the losses from the inversion of sugar, as explained previously, are relatively low. Furthermore, at a higher pH, the ion exchange bed may be operated with juice at more elevated temperatures, without undue inversion losses, thus possibly eliminating the necessity for cooling, which has resulted in considerable expense in the operation of series beds.

The juice passed to the continuous mixed bed ion exchange column is, of course, preferably first defecated, that is, treated by lime and then carbonated, to remove as many impurities as possible by relatively cheap defecation, and the pH of the juice following defecation or carbonation may be from around 6.0 to 11.5. Even in the mixed bed, there is a tendency for the pH to be lowered somewhat, such as down to about 4.0, but even a pH of 4.0 is considerably higher than the pH of 1.5 or 2.5 ordinarily produced in a series bed. However, if desired, an alkaline material, such as soda ash or caustic soda, may be added to the effluent juice.

The amount of resins used will depend, of course, upon the amount of juice to be treated. For a beet sugar factory processing 1800 tons of beets per day, a continuously regenerated mixed bed may require about 400 cu. ft. of each resin, and assuming that each resin particle remains in the column for approximately 40 min., then a flow rate of 10 cu. ft. per min. of each resin would be satisfactory. When a total of 400 cu. ft. of each resin, in the column, is compared with the necessity for 4×400 or 1600 cu. ft. of each resin for four series beds, operated so that one is in use while three are being regenerated, it will be evident that the amount of resins necessary for operation in accordance with this invention is reduced to a minimum, even allowing for an additional 300 to 400 cu. ft. of each resin for washing, separation, regeneration and rinsing.

Referring again to the drawing, the washed resins are discharged from the screen conveyor 15 onto the feed end of a wet gravity separating table, or similar hydraulically operated device, for separating the anion and cation resins. In general, the anion and cation resins differ in specific gravity, and advantage is taken of this fact in separation. A "Wilfley" concentrating table, normally used in separating ore concentrates from gangue, has been found suitable for the purpose, with certain modifications. Such a concentrating table includes a deck 20 which is reciprocated longitudinally, the deck being provided with a series of parallel, longitudinally extending riffles. The deck is tipped slightly to one side, with a feed box 22 for resins being at the head end, on the upper side, and wash water flowed onto the deck from a box or launder 23 along the upper edge. The reciprocating action of the concentrating table is such as to cause the particles to travel along the spaces between the riffles, with the heavier particles tending to move farther during reciprocation. Also, the wash water, in passing transversely across the riffles, tends to carry the lighter particles with it, from riffle to riffle, so that lighter particles are discharged over the lower side of the deck, into a box or launder 24 provided for the purpose, while the heavier particles are discharged at the tail end of the deck into a box or launder 25. In general, the cation resin particles are heavier, while the anion resin particles are lighter, so that the cation resin particles are discharged into end launder 25, from which they pass to a self-flushing screen 26 or the like, at which the wash water is drained off and recycled to the gravity table, or diverted to other use. Similarly, the anion resins are discharged into side launder 24 and passed to a self-flushing screen 27, at which the wash water may be drained, for recycling to the gravity table or diverted to other use. In general, the wash water recovered at screens 26 and 27 may be recycled to the gravity table for considerable periods of time, although fresh water may be introduced occasionally or for make-up purposes, while discarded water may be used for other purposes, such as fluming beets.

More than one gravity table may, of course, be used, depending upon the capacity of the table or tables and the amount of resins to be separated. The riffles should be at least ¼ inch in depth, such as ½ inch in depth in the case of the "Standard Riffle" "Wilfley" deck, modified so that half of the riffles, for instance, rather than only a few at the lower side, extend to the end of the table. When more than one gravity table is used, they may be placed in tiers, one above the other, with a common drive, which will reduce the initial cost as well as the floor space required.

The anion and cation resins may, of course, be separated in other ways, preferably by apparatus acting hydraulically or by fluid, such as a centrifugal fluid separator, in which a spinning motion is imparted to the fluid and the heavier particles are carried to the outside. Also, the size of the resin particles may differ, such as a larger size for the cation resins, or vice versa, so that separation may be based, at least partially, upon size. It will be understood, of course, that the particles should be treated as gently as possible, to avoid attrition or similar action which would tend to produce smaller and smaller particles, since fine particles, as indicated previously, have been found to decrease the effectiveness of the bed and also tend to be lost upon drainage of regenerant liquid or rinse water and therefore require the addition of undue amounts of new resins for replacement purposes.

After the resins are separated and drained, they are regenerated, as by use of a dilute alkali solution for the anion resins and a dilute acid solution for the cation resins, the latter preferably in stages. Such regeneration may be by batch, or, as shown in Fig. 1, may be continuous, the latter being preferable. Thus, the separated cation resins are permitted to flow by gravity from drainage screen 26 into a cation regeneration tank 28 to which a dilute acid is supplied for regeneration, i. e. replacement of $Na^+$, $K^+$, $Ca^{++}$, $Mg^{++}$ or other inorganic or organic cation, the resulting $Na_2SO_4$, $MgSO_4$ and the like passing from the tank with the spent regenerant. The resin passes downwardly through a feed tube 29, so as to be deposited on the lower end of a slat conveyor 30, driven slowly by rolls 31, each successive portion of the resin deposited on conveyor 30 forming a continuous layer, such as between 12 in. and 24 in. thick, or any other desired thickness. Feed tube 29 has preferably the same width as the conveyor 30, and may discharge the resins onto a baffle 32, acting also as a distributing plate. Conveyor 30 is preferably provided with slats or the like to insure that the resin layer will move upwardly with it, and is moved at a sufficiently slow rate so that each successive portion of the resin will be contacted by the regenerant solution for a sufficient period of time, such as a total time of 15 minutes. Conveyor 30 also may be a perforated strip, or a woven wire screen, through which the resins will not fall but through which the regenerant solution may pass upwardly. The regenerant solution may be introduced as uniformly as possible over the area of the bottom of tank 28, as by a series of nozzles or other distribution devices. As the regenerant solution flows upwardly through the conveyor and through the cation resin, the latter is at least partially regenerated, and after such regeneration is discharged from the upper end of the conveyor, as into a feed tube 29' for discharge onto the lower end of a slat conveyor 30' disposed in a second stage regeneration tank 28'. Conveyor 30' may be a slat conveyor similar to conveyor 30, and a baffle 32' may be provided in tank 28', which is similar to tank 28, fresh acid regenerant being introduced into the bottom of tank 28', in a manner similar to that described in connection with tank 28. Tanks 28 and 28' are, of course, closed at the top, while conveyor 30 and 30' preferably extend across the full width of tank 28 and 28', respectively. The once-used regenerant from tank 28', removed at a suitable point above conveyor 30' such as adjacent the feed tube 29', may be pumped to the bottom of tank 28, while the spent regenerant from tank 28, removed at a suitable point above conveyor 30 such as adjacent tube 29, may be passed to waste or otherwise disposed of.

From the final cation regeneration tank 28', the cation resin may be passed to the cation rinse, such as a belt or screen 33, as of woven wire, on which the resins are deposited and onto which rinse water, which may be raw water, may be sprayed, as from nozzles. The rinse water, after passing through the resins, may drain into a tank or tray 34, and be utilized to dilute additional acid for cation regeneration, as indicated.

Similarly, after drainage of the anion resin on screen 27, the anion resin may be regenerated in a tank 36, through the bottom of which a dilute alkali, such as NaOH or NH₄OH may be introduced, to cause the OH⁻ ions to be exchanged for acid radicals, such as Cl⁻, SO₄⁼, and various other inorganic and organic radicals, the resulting compounds, such as NaCl, NH₄Cl, Na₂SO₄, (NH₄)₂SO₄, and the like, being carried off by the spent regenerant. The anion regeneration tank 36 may be similar in construction to cation regeneration tanks 28 and 28′, having therein a slat conveyor 37, formed of perforated strip, woven wire screen or the like and also provided with slats at sufficient intervals to insure movement of the resin and maintenance of the layer on the conveyor. Also, the anion resin may pass from screen 27 through a feed tube 38 onto the lower end of conveyor 37, a baffle 39 being provided, if desired, to direct the resin onto the conveyor and also tend to distribute the same as evenly as necessary. The regenerant solution, such as dilute ammonia, as about 2 to 5%, may be introduced relatively evenly over the bottom of the tank 36, as through a number of nozzles, so that the regenerant solution will pass upwardly through the layer of anion resin on the conveyor, which layer may again be 12 in. to 24 in. thick, or any other desired thickness. Conveyor 37 is driven, as by roll 40, at a suitably slow speed so that each resin particle will remain a sufficient period of time in the tank, such as 15 min., to insure regeneration. The exhausted regenerant may be removed from tank 36 at a suitable point above conveyor 37, such as adjacent tube 38, and itself regenerated, as in the manner disclosed in the Robert H. Cotton, Guy O. Rorabaugh, and William A. Harris application Serial No. 145,208, filed February 20, 1950, and entitled "Regeneration of Ion Exchange Material." Or, the exhausted regenerant may be discharged to waste, and, if desired, the spent regenerant from both anion and cation regeneration may be mixed, to produce a more nearly neutral solution, to avoid damage to sewer pipes and the like.

After regeneration, the anion resin is directed from the upper end of conveyor 37 onto an anion rinse screen 41, onto which the deionized water, previously produced from washing the spent resins, is utilized for rinsing the regenerated resins. After passage through the resins, the rinse water may collect in a tank or tray 42, and, as indicated, may be utilized for dilution of additional alkali, for subsequent regeneration.

After the regenerated anion and cation resins have been rinsed, they may be discharged onto an upwardly inclined slat conveyor 43, which will convey the resins upwardly without attrition or grinding, to the resin inlet pipe 10 for the continuous column. Or, the resins may be discharged into a mixed resin supply hopper (not shown), from which the resins may be fed by gravity at a desired rate into the column inlet pipe 10. As shown in the drawing, the resins may flow by gravity from the resin outlet 13 to the screen belt 15, thence to the hydraulic separator, screens 26 and 27, and then through the regeneration tanks and to the rinsing screens, since during each such passage substantially as much liquid as possible has been drained off. However, whenever the resins are elevated, as in the regeneration tanks 28, 28′ and 36, and between the final rinsing stage and the column, a slat conveyor or equivalent apparatus for moving the resins without attrition is utilized. It will be understood, of course, that the rinsing of the anion or cation resins, or both, may be accomplished in a tank similar to tanks 28 or 36 and in which is disposed an upwardly moving slat conveyor or the like, and also that the regenerant liquid may be sprayed onto a moving layer of resins, supported by a screen conveyor similar to the rinse screen conveyor 33 or 41, or the sweetening off and deionizing screen 15. For anion regeneration in such an instance, the cooling tank or tray beneath the screen may be similar to the trays beneath rinse screens 33 and 41, and for the cation regeneration screen, a tray similar to the tray beneath the sweetening off and deionization screen 15 may be utilized, i. e. with a partition or baffle between two sections, so that fresh regenerant solution may be sprayed onto the last section of the screen, then collected in the tray beneath and pumped to the nozzles for the initial section of the screen. It will also be understood, of course, that anion regeneration may be carried out in more than one stage and cation regeneration in more than two stages.

As illustrated in Fig. 2, the continuous column, instead of being positioned with the resin outlet above the screen 15, may be positioned below the final rinse step after regeneration, so that the fresh resins may flow by gravity into the resin inlet pipe or tube 10. Also, the juice carrying spent resins may flow by gravity to a centrifugal pump 45, which is preferably a flooded pump of a type having relatively large runner clearances, as, for instance, normally utilized in pumping sewage, so that the possibility of any grinding or attrition of the resins will be minimized. The pump 45 may be utilized in elevating the juice carrying the spent resins to the screen belt 15, and the separated juice merely returned to the juice inlet of the continuous column. Otherwise, the modification of Fig. 2 may be similar in other respects, and may include the variations described, in connection with Fig. 1. Furthermore, in the apparatus of Fig. 1, in lieu of the slat conveyor 43, a flooded pump similar to pump 45 of Fig. 2 may be utilized, for elevating the fresh resins from the regeneration rinse to the resin inlet pipe 10 of the continuous column. The liquid used to flood the resins may conveniently comprise the purified juice, a portion of which may be supplied from the juice outlet 11 to such a flooded pump, in which case the juice carrying the resins may merely be reintroduced into the continuous column, along with the resins. An indicated previously, special provision for mixing the resins will normally be found unnecessary, although the same may be provided if desired.

It will be evident that the initial cost, i. e. plant investment, required to provide the apparatus of this invention, is considerably less than that necessary for a series bed operation. The continuous column may be made of considerably thinner material, and therefore is less costly, than the tanks conventionally utilized to contain resins in fixed beds, since the mixed bed of this invention may be operated at atmospheric pressure, whereas fixed beds are generally operated in columns whose test pressure is about 60 lbs. per sq. in. Furthermore, the column need not be rubber-lined or made of special acid-resistant material, since the pH of the juice in the column is maintained higher than in the case of series beds and the problems produced by greater acidity are not involved, and only one column is required, compared to eight columns generally required for series bed operation. The initial investment in the resin draining, separating and regeneration equipment is also reduced to a minimum, through continuous operation, as well as the initial investment in resins, which are relatively expensive in comparison with most other raw materials utilized in a sugar factory. Thus, the continuous column requires only about one-fourth the amount of resins which would be required for four series beds in a plant of equivalent capacity, while the amount of resins present in the separation and regeneration portions of the circuit will add up to less than resins required for an additional fixed bed. For instance, on the basis of a flow of 10 cu. ft. per min. of each resin, the sweetening off and deionizing belt 15 may have on it, at any particular instant, a total of perhaps between 10 and 20 cu. ft. of each resin, the regeneration tanks may contain about 150 cu. ft. of each resin, and the rinse screens each from about 10 to 20 cu. ft. of each resin, which comes to a total of 170 to 190 cu. ft. of each resin. Even though a total of another 170 cu. ft. of each resin is on the drainage screens 26 and 27, the slat conveyor 43, and at intermediate points between the various parts, the final total is less than, and in any event no more than, that necessary for an additional series bed, i. e. 400 cu. ft. each of anion and cation resins. In general, it may be stated that the initial investment in ion exchange equipment may be approximately one half of that required for series beds. Moreover, there are additional economies in plant investment. As pointed out previously, since the juice in the column may be maintained at a higher pH, and inversion losses caused by higher temperatures are not a deterring factor, the juice may be passed through the column at a considerably higher temperature than through series beds, so that cooling and reheating equipment for the juice may be reduced or eliminated from the plant. In addition, the operating costs should also be lower, in comparison with series bed operations, since reheating of the juice prior to or during evaporation may be eliminated.

It will further be evident that a higher purity of treated juice can be obtained, as explained previously, since the effluent juice from a mixed bed can be maintained at a higher purity than the effluent juice from series beds. Some of this increase in purity can, of course, be accounted for by the reduction in the amount of invert sugar produced. Nevertheless, the high degree of purity of the juice produces further economies in subsequent plant operations. For instance, a relatively greater proportion of sugar can be crystallized in the "white" vacuum pan, and smaller amounts of impure syrups or molasses will be produced, with a consequent reduction in amounts of remelt massecuite. It is contemplated that the ion exchange method and apparatus of this invention will eliminate entirely the desirability of utilizing a Steffens House or other operations for the recovery of sugar from relatively low grade molasses, thus eliminating a comparatively large cost factor in plants which have previously given the highest degree of recovery. It will also be evident that while this invention has been described in connection with the treatment of beet sugar juice, it is also applicable to cane sugar juice. Thus, it may be concluded that the method and apparatus of this invention fulfill to a marked degree the requirements and objects hereinbefore set forth.

It will be evident, of course, that various changes may be made in the method of this invention, and particularly in the apparatus utilized to carry out such method, in addition to the variations previously described. For instance, other types of regeneration equipment may be utilized. Also, a slightly greater proportion of anion resin may be utilized, and a portion of the anion resin fed into the continuous column at a point closely adjacent the treated juice outlet, so that the juice, just prior to leaving the column, will pass through a layer of anion resin, which will act as a buffer, to increase the pH of the juice. Hydraulic separation devices other than wet gravity concentrating tables may be used, although the latter may be found preferable since the separation is carried out with the resins "flooded," which decreases the possibility of loss due to fines. Also, gravity concentrating tables are readily purchased, and while changes in the arrangement or length of certain riffles may be necessary, such changes are readily made, even though a wet gravity table which is satisfactory for ore separation is highly unlikely to be satisfactory without change for separation of anion and cation resins, and vice versa.

It will further be evident that other embodiments may exist, as well as additional variations, without departing from the spirit and scope of this invention.

What is claimed is:

1. In a method of purifying sugar juices and the like, the steps of passing such juice through a mixed bed of anion and cation resins; substantially continuously introducing fresh resins to said bed at a predetermined point thereof; substantially continuously removing exhausted resins from said bed at a spaced point; and hydraulically separating the anion resins from the cation resins by a cross flow of wash water over a tilted bed having longitudinally extending riffles.

2. Apparatus for purifying sugar juices and the like, which comprises a generally vertical column for containing a mixed bed of anion and cation resins; an inlet for substantially continuously supplying juice to be purified at the lower end of said column; an outlet for substantially continuously removing purified juice at the upper end of said column; inlet means for substantially continuously supplying fresh anion and cation resins to the upper end of said bed, but below the point of removal of treated juice; an outlet for substantially continuously removing exhausted resins hydraulically from the lower end of said column by a portion of the incoming juice which flows out with said exhausted resins; perforate conveyor means for maintaining a continuously moving layer of exhausted resins after removal from said bed, and for draining such juice from said exhausted resins; means for spraying water on said resins during such drainage to displace juice therein; means for returning the drained juice and water as sweet water to the incoming juice; a wet gravity shaking table having a tilted bed provided with longitudinally extending riffles for hydraulically separating the anion and cation resins by a cross flow of wash water thereover; means for draining such wash water from said anion and cation resins separately; an inclined perforate conveyor for establishing an upwardly moving layer of the drained anion resins; means for flowing a dilute alkali regenerant upwardly through said anion resin layer; a plurality of inclined perforate conveyors for establishing successive upwardly moving layers of cation resins; means for continuously supplying a dilute acid regenerant and causing said regenerant to flow upwardly through the last of said cation resin layers; means for removing said regenerant after passage through each said cation resin layer and causing the same to flow upwardly through the next preceding layer; perforate conveyor means for establishing a generally horizontal moving layer of said cation resin; means for spraying water thereon for rinsing; perforate conveyor means for establishing a generally horizontal moving layer of said anion resin; means for spraying water thereon for rinsing; means for transferring the regenerated and rinsed anion and cation resins to said mixed bed; and means for effecting the passage of anion and cation resins by gravity to said gravity table and to the next and each subsequent piece of apparatus, to and including said rinsing conveyors.

3. In apparatus for purifying sugar juices and the like, means for containing a mixed bed of anion and cation resins; means for passing said juice through said bed; means for substantially continuously introducing fresh resins to said bed at a predetermined point thereof; means for substantially continuously removing exhausted resins from said bed at a spaced point; and a wet gravity shaking table for hydraulically separating the anion resins from the cation resins, said table having a tilted bed provided with longitudinally extending riffles at least ¼ inch deep, at least half of said riffles extending to the end of said table, and means for producing a cross flow of wash water over said riffles.

4. In apparatus for purifying sugar juices and the like, a vessel for containing a mixed bed of anion and cation resins; means for substantially continuously introducing fresh anion and cation resins into said vessel at a predetermined point thereof; means for substantially continuously removing the exhausted resins hydraulically from said vessel at a spaced point; means for introducing juice to be purified into said vessel adjacent the point of removal of said exhausted resins so that a portion of the incoming juice will flow out with the exhausted resins; means for removing purified juice from said vessel adjacent the point of introduction of fresh resins; means for draining such juice from said exhausted resins and washing said resins; means for returning such drained juice and wash water as sweet water to the incoming juice to said bed; a wet shaking gravity table for hydraulically separating the anion resins from the cation resins; an inclined screen for separating gravity table wash water from said separated anion resins; an inclined screen for separating gravity table wash water from said separated cation resins; and means for separately regenerating said anion resins and said cation resins.

5. In apparatus for purifying sugar juices and the like, a vertically disposed column having a conical bottom for containing a mixed bed of anion and cation resins; a generally vertical inlet pipe for substantially continuously introducing fresh anion and cation resins into said column adjacent the upper end thereof; an outlet for removing purified juice from said column adjacent the upper end thereof, said resin inlet pipe extending downwardly to a point below said juice outlet; an inlet connected with the lower end of said conical bottom for introducing juice to be purified; an outlet for exhausted resins connected to the upper portion of said conical bottom, whereby a portion of the incoming juice removes exhausted resins; and a balffle between said juice inlet and said resin outlet and extending for a substantial distance from one wall of said conical bottom at a point between said juice inlet and resin outlet.

References Cited in the file of this patent

UNITED STATES PATENTS

| | | |
|---|---|---|
| 329,331 | Matthiessen | Oct. 27, 1885 |
| 860,068 | Uhland | July 16, 1907 |
| 1,781,810 | Dyer | Nov. 18, 1930 |
| 2,461,505 | Daniel | Feb. 15, 1949 |
| 2,461,506 | Daniel | Feb. 15, 1949 |
| 2,522,797 | Paley | Sept. 19, 1950 |
| 2,528,099 | Wilcox | Oct. 31, 1950 |
| 2,563,006 | Collier | Aug. 7, 1951 |
| 2,572,848 | Fitch | Oct. 30, 1951 |
| 2,578,937 | Kunin | Dec. 18, 1951 |
| 2,597,693 | Wolcott | May 20, 1952 |
| 2,619,413 | Hill et al. | Nov. 25, 1952 |

FOREIGN PATENTS

| | | |
|---|---|---|
| 578,520 | Great Britain | Sept. 6, 1943 |
| 604,688 | Great Britain | July 8, 1948 |

OTHER REFERENCES

Ser. No. 359,575, Smit (A. P. C.), published May 11, 1943.

Amberlite Ion Exchange Resins (1949), Rohm & Haas Co., Philadelphia, "Amberlite Monobed Deionization," pp. 1–12.

"Mixed Bed Deionization," published Aug. 8, 1949, by Rohm & Haas Co., Philadelphia, pp. 1–8.

Wilcox: New Developments in Ion-Exchange, Dec. 1948, pp. 27–29.